Sept. 5, 1967    J. J. HRONAS    3,339,801
FEEDING APPARATUS FOR LIQUID TREATING AGENT
Filed Aug. 20, 1965    2 Sheets-Sheet 1

INVENTOR.
JOHN J. HRONAS.
BY
William L. Krayer.
ATTORNEY.

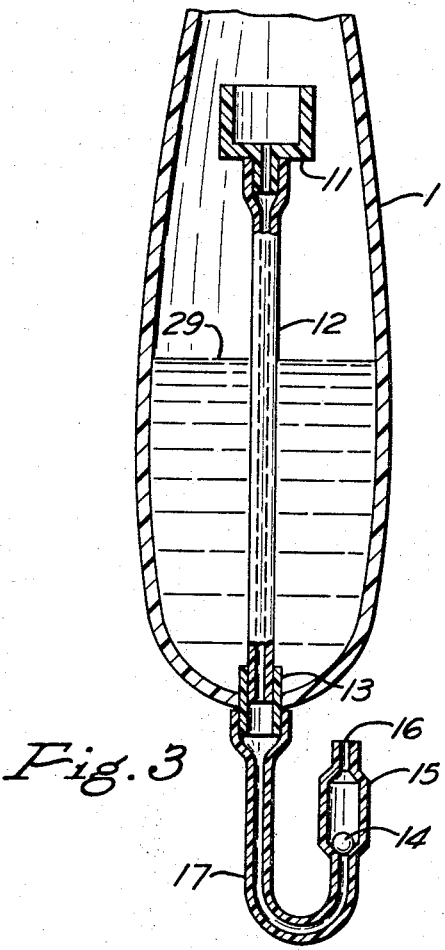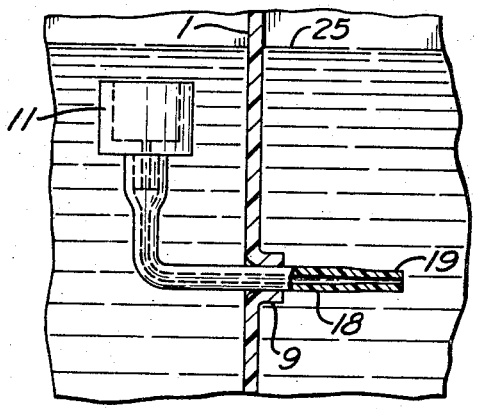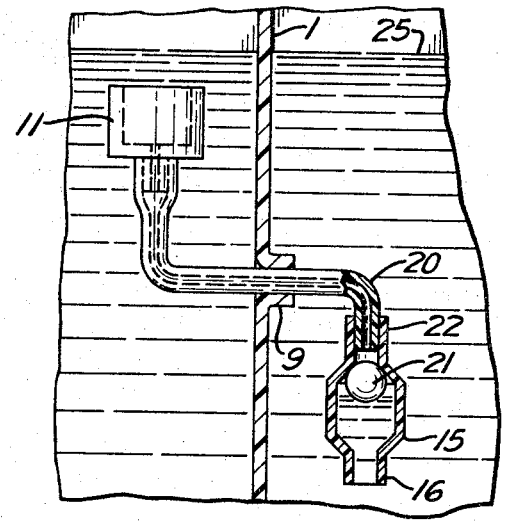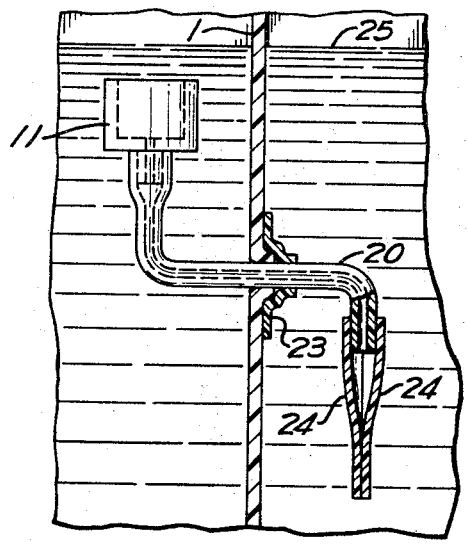
INVENTOR.
JOHN J. HRONAS.
BY
William L. Krayer.
ATTORNEY.

United States Patent Office 3,339,801
Patented Sept. 5, 1967

3,339,801
FEEDING APPARATUS FOR LIQUID
TREATING AGENT
John J. Hronas, Pittsburgh, Pa., assignor to
Calgon Corporation
Filed Aug. 20, 1965, Ser. No. 481,358
5 Claims. (Cl. 222—57)

This invention relates to an apparatus for feeding a liquid into another liquid which fluctuates in depth, but always returns to substantially the same level. In particular, it relates to an apparatus for feeding a small amount of a liquid into the reserve tank of a commode each time the commode is flushed.

Tanks containing water, as well as the out-flowing conduits connected to them, are subject to corrosion, scale-formation, growth of microorganisms, and unpleasant odors. Toilet bowls, for example, generally require periodic cleaning, deodorizing, bleaching, and disinfecting due to these difficulties. It has long been desired to minimize such tasks by the automatic addition of chemical agents to the toilet water. Heretofore, however, no effective, inexpensive feeder was available to perform these tasks automatically.

I have invented an apparatus which will feed a predetermined small amount of a liquid into a larger body of water each time the larger body fluctuates in depth where the larger body repeatedly returns to substantially the same level. The reserve tank water of a commode is such a body of water. One may fill my feeder with the desired agent, such as a detergent, disinfectant or the like, and the task will be performed automatically each time the commode is flushed. Manual cleaning, etc., of the commode may never again be required, depending, of course, on the efficacy of the chemical used.

Figure 1:
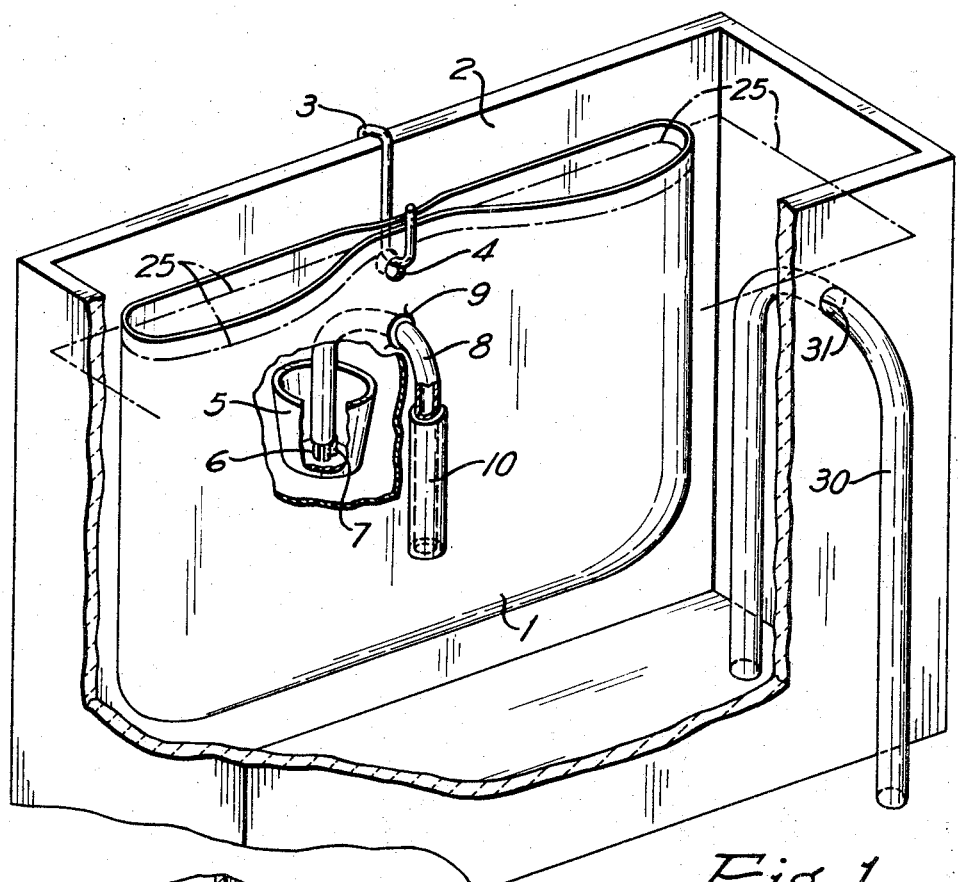
Figure 2:
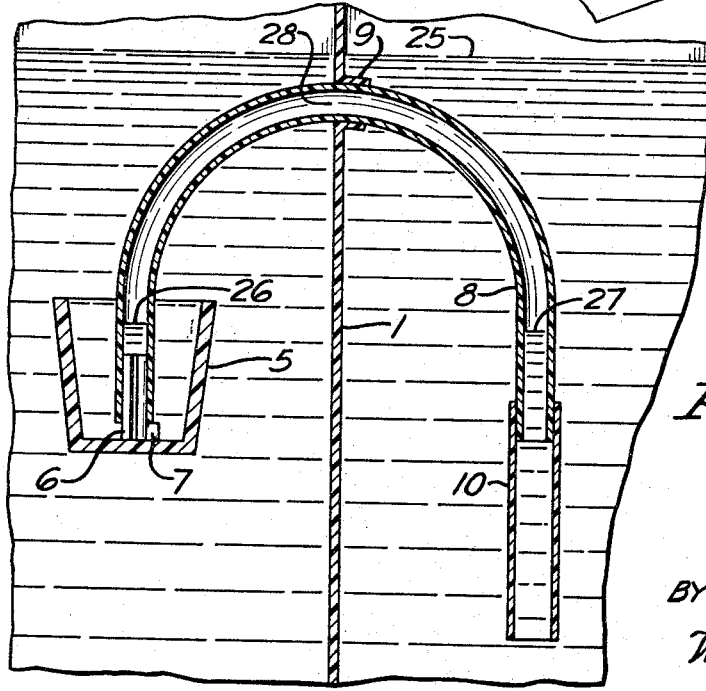

In the accompanying drawings, I have shown certain presently preferred embodiments of my invention. FIGURE 1 is a view of a large tank equipped with a siphon and containing a bag through which a curved tube passes to a small reservoir. FIG. 2 is an enlarged view of the reservoir of FIG. 1, showing its detailed construction. FIG. 3 is a view of a bag containing a small reservoir from which a tube passes through the bottom of the bag to an inverted ball valve. FIG. 4 shows a small reservoir to which is joined an L-shaped tube which passes through a bag and has a constriction at its end. FIG. 5 illustrates a step-shaped tube passing through a bag and having a small reservoir at one end and a ball valve at the other. FIG. 6 is similar to FIG. 5 except that a flapper check replaces the ball valve.

In FIG. 1 and the detailed illustration of FIG. 2, the bag 1 is any water-impermeable flexible bag; it is suspended in a large tank 2 by means of a wire or cord 3 passing through holes 4 in the bag. A small reservoir 5 is contained in the upper portion of the bag. Rising from the center of the reservoir and attached thereto is a slitted cylindrical post 6 having a small stop 7 at its base which prevents a curved tube 8, securely fitted over the post, from touching the base of the reservoir. The curved tube passes above the top of the reservoir and through a puncture in the bag forming a puncture seal 9. To the other end of the curved tube is secured a second tube 10 having a length and inside diameter sufficient to draw liquid out of the reservoir and into the tank 2. Tank 2 is equipped with a siphon 30 which passes through it at seal 31.

FIG. 3 shows a variation of my invention. In FIG. 3 a flexible bag 1 is again suspended in a tank by means of a wire or cord passing through holes in the bag. The reservoir 11, however, is constructed with a nozzle at its base, to which is joined a tube 12 which passes through the bottom of the bag where a tube seal 13 (a short tube passing through the bag) prevents leakage. An inverted ball valve is joined to the seal. An inverted ball valve consists of a lightweight but denser-than-water ball 14 enclosed in an enlarged tube 15 to which is joined two smaller sized tubes, a short tube on top 16 and a U-shaped tube 17, the other end of which is joined to the tube seal.

FIG. 4 is an enlarged view of another variation. Reservoir 11 is joined to an L-shaped tube 18 having a constriction at its end 19 which passes through a puncture seal 9 in the bag 1.

FIG. 5, a further variation, shows a step-shaped tube 20 passing through a puncture seal 9 in the side of a bag 1, and having a small reservoir 11 at its upper end and a ball valve at its lower end. The ball valve consists of a lighter-than-water ball 21 contained in an enlarged tube 15 to which is affixed two short smaller sized tubes 16 and 22, the upper one 22 of which is joined to step-shaped tube 20.

FIG. 6, a still further variation, illustrates a small reservoir 11 to which is joined a step-shaped tube 20 which passes through a reinforced puncture seal 23 in the side of bag 1. To the lower end of the step-shaped tube is joined a flapper check which consists of two flat strips of water-impermeable material 24 sealed at the edges and open at the ends.

The action of my invention may be demonstrated with virtually any feeder liquid. The bag can be nearly filled with a corrosion inhibitor, scale inhibitor, biocide, detergent, or odor remover, for example, and suspended in the reserve tank of a commode. The bag must be placed in the tank at a depth low enough for feeder liquid to flow into the reservoir, yet not so low that tank water flows over the top of the bag. If the tank is not a commode and is equipped with a siphon 30 as in FIG. 1, the top of the bag should be higher than the top of siphon 30.

As those skilled in the art know, the level of the feeder liquid in the bag will rise and fall approximately equally with the level of water in the tank, even when the bag is almost empty.

Referring to FIGS. 1 and 2, tank water from a source not shown gradually rises to level 25. As it rises, it fills the tube 10 until the feeder liquid, which rises simultaneously with the tank water, flows into the reservoir and up tube 8 to level 26 causing the tank water in the tube 10 to recede to an equal level 27. Thus, there is an air pocket 28 between level 26 and level 27 separating the two liquids. When the tank water has risen to the top of siphon 30, it will empty through this siphon. As the tank empties, the levels of feeder liquid and tank water will simultaneously fall below 27, and the column of tank water from 27 to the end of tube 10 will siphon the feeder liquid from the reservoir into the tank emptying the reservoir. The remaining feeder liquid falls to level 29, forming a pouch as in FIG. 3. The amount of tank water emptied each time is controlled by the size of the tank and the height of the top of siphon 30. Should tank 2 be the reserve tank of a commode, siphon 30 will not be necessary as flushing the commode will empty the tank.

This process continues over and over again until the bag is emptied of feeder liquid and must be refilled. In this way the tank and the pipes leading from it are kept corrosion, scale, and odor free, disinfected, and clean. In the case of a commode, the bowl of the commode will also be subjected to this treatment.

I theorize that the apparatus of FIG. 1 operates primarily upon siphoning principles. That is, that gravity pulls the column of feeder liquid in tube 10 down a small amount, causing the air pocket 28 to expand and therefore to be under less than atmospheric pressure. The greater atmospheric pressure on the top of the liquid in the reservoir forces the feeder liquid in the reservoir up into tube 8. Tube 10 must have a length and width sufficient to contain a large enough volume of tank water to draw the feeder liquid in tube 8 far enough past the top of the bend so that the weight of the feeder liquid thereby drawn into tube 10 exceeds the weight of feeder liquid from the top of the bend to the feeder liquid level in the reservoir.

The apparatus in FIG. 3 operates in much the same manner but with no siphoning action. Instead, the ball valve prevents tank water from filling the reservoir when the tank water level is rising. When the tank water level is falling, the pressure of the feeder liquid in the reservoir lifts the ball and feeder liquid flows into the tank.

In FIG. 4, a constriction prevents tank water from filling the reservoir as the tank water level rises. Tank water passes so slowly through the constriction that by the time it has filled a small part of the tube 18, the reservoir has filled with feeder liquid.

FIG. 5 utilizes a ball valve to prevent tank water from filling the reservoir 11. As the tank water level rises and fills tubes 16 and 15, lighter-than-water ball 21 floats up and blocks the entrance to tube 22.

In FIG. 6, tank water cannot enter tube 20 because the flapper check is closed, but once the tank water level has receded, the pressure of the feeder liquid in the reservoir is sufficient to open the check so that feeder liquid may flow into the tank.

The apparatus of my invention is not limited to use in tanks where the water level rises and falls. It is equally suited for use in tanks having a constant water level where the apparatus is secured to a device which periodically dips into the tank.

Many variations of my invention are possible. The ball valve of FIG. 5 and the flapper check of FIG. 6 may be used on the apparatus of FIG. 3 in place of the inserted ball valve of FIG. 3. The flapper check of FIG. 6 could also replace the constriction in FIG. 4. The reservoir 11 of FIGS. 3, 4, 5, and 6 could be used with the apparatus of FIG. 1 if the tube 8 is bent up and then down again. The seals may also be interchanged, but the stronger seals should be used where the pressure is greater. Many other rearrangements are also possible within the skill of the art.

The only essential elements of my invention are: (1) a flexible bag, (2) a means of suspending the bag, (3) a small open reservoir within the bag, (4) a tube passing from the reservoir to the outside of the bag, (5) a seal at the point where the tube passes through the bag if it does so, (6) a means for preventing tank water from entering the tube and filling the reservoir, and (7) a siphon for causing the tank water to empty if the tank water is not emptied by some other device.

The bag need only be partially flexible. It could have a rigid back or side. It may be almost any size and shape including spherical, cylindrical, or pear-shaper. It may be made of any flexible water-impermeable material, such as plastic, rubber, or polyethylene. It may be sealed at the top and have a plug for refilling, or it may be manufactured with an appropriate feeder liquid already sealed in so as to be disposable.

The reservoir may vary widely in shape and size. It should, however, generally have a shape which will facilitate the flow of feeder liquid into it and out of it. Its size is governed by the amount of feeder liquid one wishes to admit into the tank each time the tank water level rises and falls. The reservoir may be closed on top, having only a hole or two to permit feeder liquid to enter, or it may have an adjustable volume.

Many variations of the tube have already been illustrated. FIGS. 1 and 2 show a curved tube 8, FIG. 3 a straight tube 12, FIG. 4 an L-shaped tube 18, and FIGS. 5 and 6 a step-shaped tube 20. The tube should not be so small as to prevent the liquids from easily flowing through it, nor should it be unnecessarily large. If the curved tube 8 is used, it may pass above the tank water level or over the edge of the bag, in which case no seal is necessary.

Varieties of seals have also been illustrated. FIGS. 1, 2, 4 and 5 show a puncture seal, FIG. 3 shows a tube seal, and FIG. 6 shows a reinforced puncture seal which consists of a small patch of heavier material heat-sealed to the bag through which a puncture is made.

The means for preventing the tank water from filling the reservoir in FIG. 1 is the curved tube 8 which rises higher than the reservoir; thus, the reservoir fills with feeder liquid before tank water has travelled high enough in tubes 10 and 8 to enter the reservoir. The means in FIG. 3 is an inverted ball valve, in FIG. 4 it is a constriction, in FIG. 5 a ball valve, and in FIG. 6 a flapper check. Other means of preventing the tank water from filling the reservoir are also possible.

Of all the possible variations in the apparatus of my invention, there are certain specifications which I prefer as I have found them to work well. I prefer a flat, transparent, polyethylene bag, open at the top and capable of holding about ¼ to 16 fl. oz., and a slightly tapered reservoir holding about ¼ to 6 ml. I prefer tubes 8, 12, 18 and 20 to have an inside diameter of about 0.040 to 0.060 inch, and tube 10 to have an inside diameter of about 0.060 to 0.156 inch. A wire is the preferred means of suspending the bag and a puncture seal is the preferred seal. I also prefer the feeder liquid to have a density approximately equal to that of the tank water in order to minimize problems of interdiffusion, although the apparatus works well with liquids of almost any densities. Finally, with the preferred apparatus of FIGS. 1 and 2, I prefer tube 8 to extend into the reservoir at least about ⅜ inch, above the reservoir about ⅛ to 1 inch, and I prefer the distance from the top of the bend of tube 8 to the bottom of tube 10 to be at least about 2 inches.

My apparatus has many advantages. It maintains the concentration of feeder liquid in the tank water at a substantially constant level, it is completely automatic and requires no attention other than replacement or refilling, it is simple and can be cheaply made, it contains few parts that can wear out or break down, and one may determine beforehand how many times the tank water level may rise and fall before the bag is emptied.

Thus, it will be seen that my invention relates to an apparatus for feeding a liquid into another liquid which fluctuates in depth, but always returns to substantially the same level, such as the tank water of a commode.

While I have shown and described certain presently preferred embodiments of my invention, it is to be distinctly understood that the invention is not limited thereto but may be otherwise variously embodied within the scope of the following claims.

I claim:
1. Apparatus for feeding a predetermined amount of a liquid treating agent into a liquid to be treated, comprising:
    (a) a tank for holding the liquid to be treated;
    (b) means for filling said tank to a predetermined level and emptying said tank;
    (c) a flexible, water-impermeable container suspended in said tank, at a point no higher than said predetermined level, for holding the liquid treating agent;
    (d) a small reservoir in a fixed position in said flexible container, having a fixed, predetermined effective volume; and
    (e) a siphon passing from inside said reservoir to a point in said tank and outside said container.
2. Apparatus of claim 1 in which the flexible water-impermeable container is suspended from the side of the tank by a hook.
3. Apparatus of claim 1 in which the siphon is attached to the flexible water-impermeable container.
4. Apparatus of claim 1 in which the small reservoir is affixed to the siphon.
5. Apparatus for feeding a predetermined amount of a liquid treating agent into a liquid in a tank which is periodically emptied and filled, comprising:
  (a) a flexible collapsible water-impermeable container for holding the liquid treating agent;
  (b) a small reservoir having an open top in a fixed position in said flexible container, having a fixed, predetermined effective volume; and
  (c) a siphon attached to the bottom of said reservoir passing from inside said reservoir to a point outside said container.

References Cited

UNITED STATES PATENTS

| | | | |
|---|---|---|---|
| 406,366 | 7/1889 | Muller | 222—416 |
| 417,576 | 12/1889 | Muller | 222—416 X |
| 2,851,201 | 9/1958 | Poitras et al. | 222—416 X |
| 2,983,929 | 5/1961 | Bolding | 4—228 |
| 3,009,168 | 11/1961 | Cooper | 4—228 |
| 3,160,330 | 12/1964 | Pollitt | 222—416 X |
| 3,181,731 | 4/1965 | Ellis | 4—227 X |
| 3,253,753 | 5/1966 | Barton et al. | 222—416 X |

FOREIGN PATENTS

| | | |
|---|---|---|
| 10,466 | 5/1906 | Great Britain. |
| 946,812 | 11/1962 | Great Britain. |
| 249,287 | 3/1948 | Switzerland. |

WALTER SOBIN, *Primary Examiner.*